3,138,780
IGNITION KEY WARNING DEVICE
Elmo A. Jacobsen, 120 N. 6th St., Heber, Utah
Filed Sept. 11, 1961, Ser. No. 137,307
1 Claim. (Cl. 340—52)

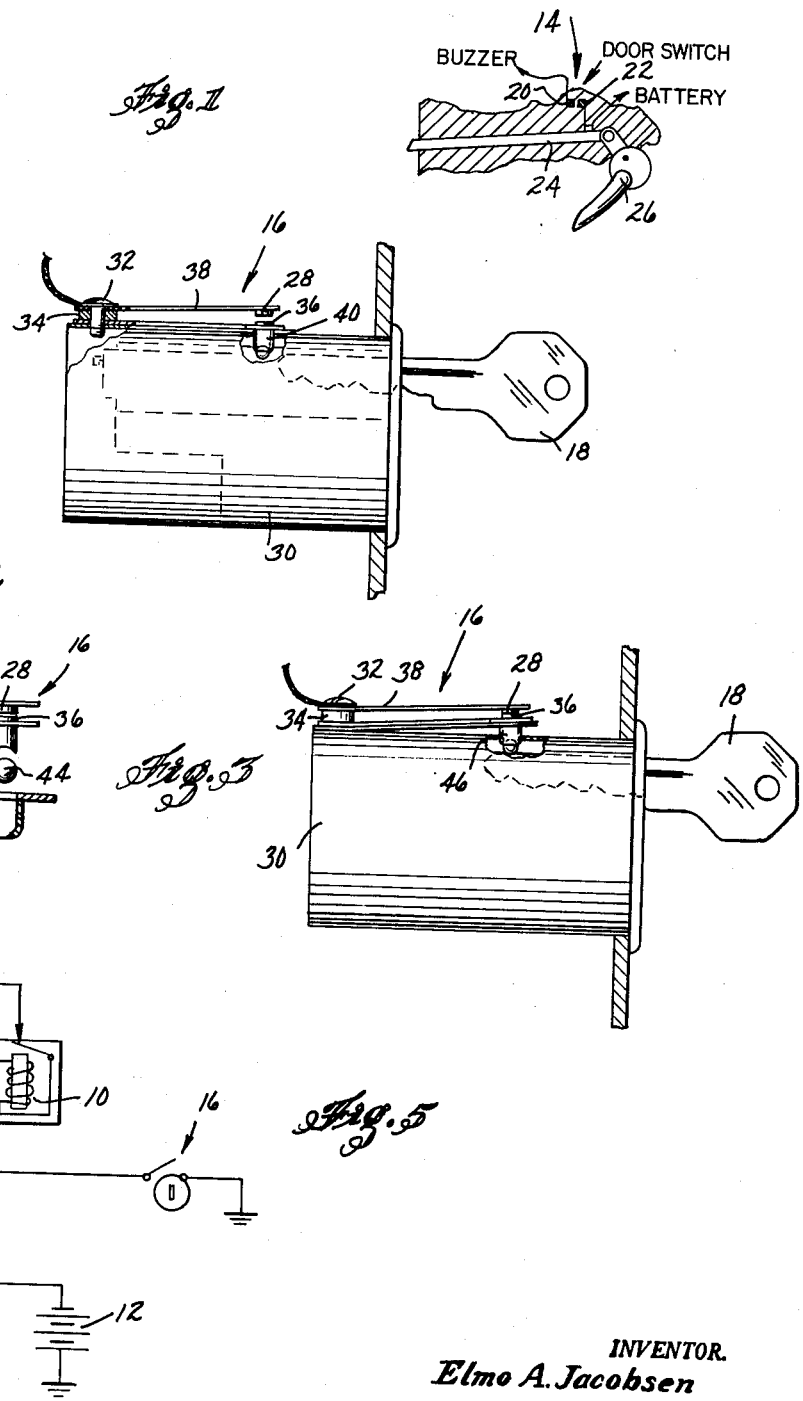

The present invention generally relates to an ignition key warning device and more particularly to a device that will warn the vehicle operator that the ignition key has been accidentally left in the ignition switch.

One of the causes of the extensive unauthorized use of automobiles is the presence of the ignition key in the ignition switch of an unoccupied vehicle. This usually occurs due to the forgetfulness of the vehicle operator. Therefore, it is the primary object of the present invention to provide a warning device which will call the operator's attention to the fact that the key has been left in the switch when he opens the door to leave the vehicle.

Another object of the present invention is to provide an attachment for a vehicle for warning the driver of the presence of the key in the ignition switch when the door of the vehicle is opened by virtue of a door latch mechanism operating a switch in a buzzer circuit.

FIGURE 1 is a side elevational view of the door handle switch illustrating schematically the orientation of the components;

FIGURE 2 is a side elevational view of the ignition switch with the attached warning switch thereon;

FIGURE 3 is a view similar to FIGURE 2 with the key in operative position;

FIGURE 4 is a fragmental sectional view of the key sensing switch; and

FIGURE 5 is a schematic view of the wiring circuit.

Referring now specifically to the drawings, the warning device includes a buzzer 10 or any other suitable audible or visual signal device mounted in any convenient position such as on the dashboard. The buzzer 10 is connected to the vehicle battery 12 by a switch 14 operated by the door latch mechanism and a switch 16 operated by an ignition key 18.

The switch 14 includes a stationary contact 20 and a movable contact 22 mounted on an operating link 24 connected to the interior door handle 26 for operating the latch mechanism for the door so that movement of the handle 26 towards a door opening position closes the contacts 20 and 22 for completing a circuit therethrough.

The switch 16 includes a stationary contact 28 mounted on and insulated from the ignition switch body 30 by virtue of a fastener 32 extending through an insulating grommet 34. A movable contact 36 is also mounted on the body 30 and like contact 28 is carried by a spring arm 38. The movable contact 36 is provided with a depending cylindrical member 40 of insulating material and having a socket 42 in the lower end thereof for receiving a ball 44. The body 30 has a cylindrical sleeve 46 formed therein which receives ball 44 and member 40 and the sleeve 46 communicates with the bore 48 in the ignition lock which receives the key 18 whereby insertion of the key 18 serves to close the contacts 28 and 36 thus closing the switch 16 whenever the key is in the ignition lock regardless of the position of the ignition switch.

Thus, the circuit from the battery 12 to the buzzer 10 will be completed only when the switch 16 is closed by the presence of key 18 in the ignition switch 30 and the door switch 14 is closed by moving the door handle to door opening position thereby reminding the driver to remove the key. This also will prevent the doors from being locked with the keys inside the vehicle.

What is claimed as new is as follows:

In a vehicle having a door and operating latch handle and an engine ignition system including a storage battery and a key actuated ignition switch having a key slot, a signal system energizable in response to the opening of the door with a key remaining in the ignition switch comprising, in combination, a first normally open switch mounted upon said ignition switch having an actuating member projecting into the key slot and into the path of movement of a key inserted into said ignition switch, said actuating member closing said first switch in response to the insertion of a key into the key slot of the ignition switch, a second normally open switch having normally open contacts mounted upon said door latch handle movable to a closed position in response to opening movement of said door latch handle, a signal device, said first and second switches and said signal device being connected in series circuit relationship with said storage battery, whereby the opening of said door with a key remaining in said ignition switch effects energization of said signal device by said storage battery to emit a warning to the driver of the vehicle to remove the key from said ignition switch before leaving the vehicle, said first switch comprising a stationary contact mounted upon and insulated from the body of said ignition switch, a spring arm mounted upon a body of said ignition switch having a second contact mounted between said stationary contact and the body of the ignition switch in juxtaposition with said stationary contact, said actuating member comprising a spherical detent rotatably carried by said spring arm, said switch body having an opening communicating with the key slot rotatably receiving said spherical detent therewithin, said spherical detent extending into the key slot and slidably accommodating relative longitudinal movement of an ignition key within said key slot, whereby a key within said key slot acts upon said detent, to move said second contact into circuit closing engagement with said stationary contact.

References Cited in the file of this patent

UNITED STATES PATENTS

| 2,613,258 | Azano | Oct. 7, 1952 |
| 2,756,408 | McKaig | July 24, 1956 |
| 2,773,249 | De Santis | Dec. 4, 1956 |
| 2,780,797 | Gooding | Feb. 5, 1957 |
| 2,799,843 | Savino | July 16, 1957 |

FOREIGN PATENTS

| 90,122 | Austria | Nov. 1922 |